United States Patent [19]

Hunt

[11] Patent Number: 5,781,923
[45] Date of Patent: Jul. 14, 1998

[54] ADDING A FIELD TO THE CACHE TAG IN A COMPUTER SYSTEM TO INDICATE BYTE ORDERING

[75] Inventor: Douglas B. Hunt, Fort Collins, Colo.

[73] Assignee: Hewlett-Packard Company, Palo Alto, Calif.

[21] Appl. No.: 654,469

[22] Filed: May 28, 1996

[51] Int. Cl.$^6$ ............................................. G06F 13/00
[52] U.S. Cl. .............................. 711/128; 711/156
[58] Field of Search ...................... 395/455; 711/156, 711/128, 158

[56] References Cited

U.S. PATENT DOCUMENTS

| | | | |
|---|---|---|---|
| 4,959,779 | 9/1990 | Weber et al. | 395/411 |
| 4,999,808 | 3/1991 | Blahut et al. | 395/898 |
| 5,025,366 | 6/1991 | Baror | 395/455 |
| 5,056,091 | 10/1991 | Hunt | 395/182.08 |
| 5,155,832 | 10/1992 | Hunt | 395/447 |
| 5,398,328 | 3/1995 | Weber et al. | 395/500 |
| 5,408,664 | 4/1995 | Zarrin et al. | 395/652 |
| 5,586,279 | 12/1996 | Pardo et al. | 395/403 |
| 5,687,337 | 11/1997 | Carnevale et al. | 395/380 |

OTHER PUBLICATIONS

Intel, "Cache Tutorial", Intel Corporation, sections 1.3 and 2.2.1, 1991.
Microsoft, "Computer Dictionary: The Comprehensive Standard for Business, School, Library, and Home", Microsoft Press, 2nd edition, pp. 41, 60 and 241, 1994.

Primary Examiner—Tod R. Swann
Assistant Examiner—Felix B. Lee

[57] ABSTRACT

A system for indicating byte-order format information of multi-byte data contained in a cache memory. A plurality of cache lines resident in the cache memory each include cache line data copied from a main memory block, and a corresponding cache line tag. Each cache line tag includes a main memory address mapping field for providing main memory address mapping information of the cache line data of its associated cache line and a cache line byte-order format field for indicating a byte-order format of the cache line data of its associated cache line. The invention also includes a cache management system and method for managing cache move-in operations in a computer system compatible with multiple byte-order formats having a main memory organized in a default byte-order format and a cache memory. The system includes a current byte-order format indicating means for indicating the current byte-order format of a currently running process, a central processing unit, a format conversion unit responsive to a format conversion signal generated by the central processing unit for converting multi-byte data from the default byte-order format to the current byte-order format, a plurality of cache lines contained in the cache memory, each respective cache line comprising cache line data copied from the main memory at a respective main memory address, and a plurality of corresponding cache line tags, each associated with a respective cache line, and each comprising a main memory address mapping field for providing main memory address mapping information of the cache line data of its associated cache line and a cache line byte-order format field for indicating a byte-order format of the cache line data of its associated cache line.

9 Claims, 9 Drawing Sheets

ADDING A FIELD TO THE CACHE TAG IN A COMPUTER SYSTEM TO INDICATE BYTE ORDERING

FIELD OF THE INVENTION

The present invention relates generally to microprocessor systems equipped with memory caches, and more particularly, to a system and method for indicating the byte ordering of multi-byte data contained in a cache memory.

BACKGROUND OF THE INVENTION

Microprocessor systems are known in the art. A typical microprocessor system includes a central processing unit (CPU) which fetches and executes data and instructions from memory. Typically, the main memory of a system comprises a series of sequentially arranged and addressed storage locations, wherein each location holds a given amount of information, typically ranging from a single byte (8 bits) to eight bytes (64bits) or more. Generally, the smallest unit of information processed by the CPU is one byte. However, in most modern systems, the CPU is designed to process multi-byte words, typically four or eight bytes (32 or 64 bits, respectively).

In today's systems, fast "cache" memory is used to temporarily store data and/or instructions which are used, or anticipated to be used, frequently in the program sequence. Cache memory typically has access times on the order of 5 to 10 times faster than a system's main memory. Because main memory fetches are slow, the use of cache memory can significantly improve system performance by reducing data access time.

A typical cache memory is organized in blocks of sequentially addressed memory called "cache lines". The size of the cache lines vary from cache to cache, but a typical cache line contains 16 to 128 multi-byte words. As an illustration of a typical cache structure, a 2048 (2K) word cache organized in 16-word blocks would hold 128 blocks of data.

Associated with each cache line in the cache is a tag. The tag provides information for mapping the cache line data to its main memory address. Commonly used mapping functions include direct mapping and associative mapping techniques.

Execution of an instruction typically consists of three stages:

1. An instruction fetch stage;
2. An operation stage; and
3. A memory access stage.

During the instruction fetch stage, an instruction is fetched from memory. Typically, an instruction cache is utilized, whereby instructions are moved from main memory into a faster cache memory as they are anticipated to be used, to provide faster instruction access and thereby improve performance. During the operation stage, the instruction is decoded and any arithmetic operations including address calculation are performed. During the memory access stage, data is read from or written to system memory. Again, a data cache is typically used to provide faster data access and to further improve performance. Each stage in the execution of an instruction requires at least a full clock cycle to complete. Thus, execution of each instruction requires at least three clock cycles.

To improve execution throughput, most modern microprocessor systems utilize an instruction pipeline. Instruction pipelining is a known method in the art for allowing instruction execution to be overlapped.

Table 1, shown below, illustrates typical prior art operation of an instruction pipeline. As shown in Table 1, the three instruction execution stages are partitioned into three separate functional units, each capable of performing a single operation during each clock cycle. Table 1 shows three execution cycles in which instruction $I_0$, $I_1$, and $I_2$ are started. As shown, instruction $I_0$, cycles through each stage to completion. Thus, even though each instruction requires three clock cycles to complete, ideally one instruction should complete every clock cycle. However, if either the instruction to be fetched or the data item to be accessed are not resident in the cache, the pipeline sequencing must wait until completion of the cache movein before proceeding. This undesirable delay is referred to as a pipeline "bubble" because at least one execution stage lies idle while waiting for the next instruction, resulting in one or more clock cycles to pass without completing an instruction. Clearly, pipeline bubbles hinder system performance.

TABLE 1

| Cycle # | Instruction Fetch | Operation | Memory R/W |
|---------|-------------------|-----------|------------|
| $T_0$ | $I_0$ | X | X |
| $T_1$ | $I_1$ | $I_0$ | X |
| $T_2$ | $I_2$ | $I_1$ | $I_0$ |

Another cause of poor system performance occurs in computer systems which provide compatibility for differently organized multi-byte words. In the computer industry, philosophies differ on the preferable ordering of the bytes when storing a multi-byte word. A multitude of byte-order formats exist, but generally computer systems are designed to use one or a variation of one of two different byte-order formats. These formats are referred in the computer industry as "bigendian" format and "little-endian" format. In bigendian format, the byte order of stored multi-byte words is read left to right, with the highest numbered byte on the left and the lowest numbered byte on the right. In little-endian format, the byte order is read right to left, with the highest numbered byte on the right and the lowest numbered byte on the left. Thus, in a four-byte word (i.e., bytes 0–3 are addressable as a unit), the "Big Endian" representation is stored as:

Byte 0　　Byte 1　　Byte 2　　Byte 3

Likewise, the "Little Endian" representation is stored as:

Byte 3　　Byte 2　　Byte 1　　Byte 0

The use of two different byte-order formats presents a problem when computer systems of different architectures must interact or when software written for a system of one byte-order format is run on a system of a different byte-order format. In these situations, data or programs stored in one computer system according to one byte-order format would be misinterpreted by a computer system of a different byte-order format. Additionally, instructions which access or manipulate parts of data words will have greatly different results.

The incompatibility between little- and big-endian machines has generated numerous attempts to improve interoperability. Typically, the CPU will have a bit for indicating which byte-order format the currently running application was written for. When the application was written for a byte-order format opposite of the current main memory storage format, the CPU will typically cause the order of the bytes to be swapped before processing multi-byte words. Generally, a piece of dedicated byte-order format conversion hardware, usually comprised of a combination of shift registers and various logic gates, performs this function. Although such hardware may allow both big- and little-endian instructions to operate, the hardware adds to the computer system's complexity and reduces its speed. Both of these results are undesirable.

The use of an instruction or data cache only exacerbates the performance problem caused by byte-order conversion. Performing a byte-order conversion each time an instruction or data is fetched reduces the advantage of having an instruction or data cache.

In view of the aforementioned problems, it would be desirable to provide a computer system having an instruction and/or data cache with a system and method for allowing compatibility with multiple byte-order formats without increasing system complexity or sacrificing speed.

SUMMARY OF THE INVENTION

In accordance with a preferred embodiment of the invention, there is presented a system for indicating the byte-order format of multi-byte data (or instructions) in a cache memory of a computer system. The system includes a cache memory for storing and providing fast access to data from a main memory. The cache memory includes a plurality of cache lines. Each cache line includes cache line data copied from the main memory at a main memory address, and an associated cache line tag for indicating both the main memory address of the cache line data and a byte-order mode indicator representing a byte-order format of the cache line data.

In accordance with another preferred embodiment of the invention, there is also presented a system and method for managing cache move-in operations in a big- and little-endian compatible microprocessor system, where the microprocessor system includes a main system memory organized in a main memory byte-order format and a cache memory for storing and providing fast access to data copied from the main memory. The system includes a current byte-order format indicating means for indicating the current byte-order format of a currently running application. The system also includes a central processing unit which includes a cache management unit. The cache management unit determines when to copy data from the main memory into the cache memory for use by the central processing unit. The cache management unit is responsive to the current byte-order format indicating means and generates a format conversion signal when the current byte-order format does not match the main memory byte-order format. The system also includes a format conversion unit that reorders bytes of multi-byte data from the main memory byte-order format to the current byte-order format in response to the format conversion signal. The cache memory used in the system of the present invention includes a plurality of cache lines, where each cache line is made up of cache line data copied from the main memory at a main memory address, and an associated cache line tag for indicating both the main memory address of the cache line data and a byte-order format indicator representing the byte-order format of the cache line data.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENT INVENTION

Figure 1:
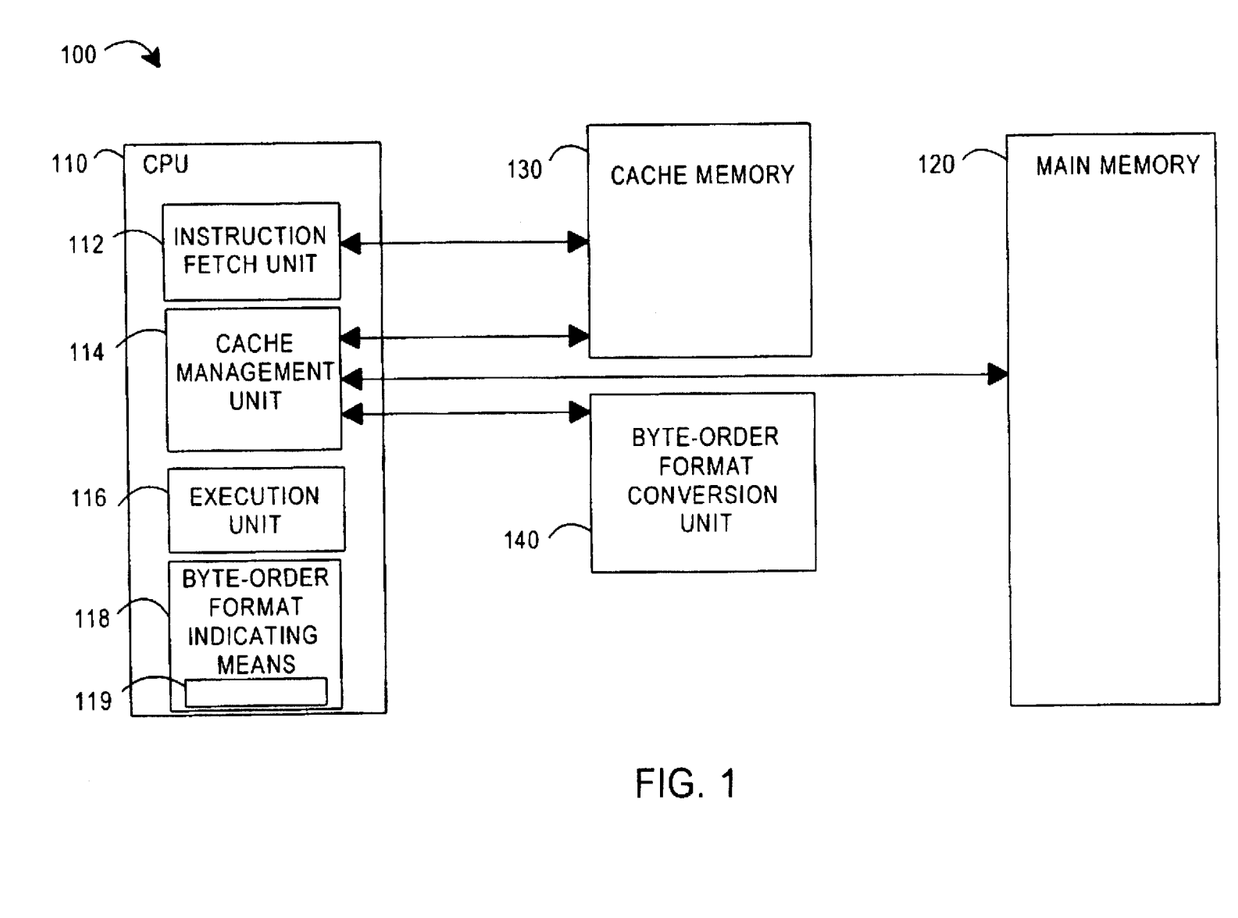
FIG. 1 is a block diagram of a microprocessor system in which the present invention operates.

There is shown in FIG. 1 a block diagram of a portion of a computing system 100 in which the present invention operates. As shown in FIG. 1, the computing system 100 includes a central processing unit (CPU) 110, a main memory 120, and a cache memory 130. The cache memory 130 is a fast memory which is typically implemented using high-speed SRAM separate from the CPU 110. The cache memory 130 may also reside within the CPU itself (i.e., on the same chip). The cache memory 130 is used to temporarily store copies of blocks of main memory data moved into the cache by the CPU 110 based on principles of temporal and spatial locality. Temporal locality, which is especially useful with respect to data access, is the principle that a given memory address accessed once is likely to be accessed again in the near future. Spatial locality, which is especially useful with respect to instruction fetches, is the principle that if a given memory address is accessed, another memory address within close spatial proximity is likely to be accessed in the near future.

The central processing unit 110 includes an instruction fetch unit 112 for fetching an instruction to be executed, a cache management unit 114 for moving data and/or instructions from the main memory 120 into the cache memory 130, an execution unit 116 for performing the operation of the fetched instruction, and a current byte-order format indicating means 118 for indicating the byte-order format of the currently running system application. The current byte-order format indicating means 118 may reside within the CPU 110 itself, or alternatively, it may reside apart from the CPU 110. The CPU 110 of the preferred embodiment is compatible with both big- and little-endian format applications, and operates according to the current byte-order format indicated by the byte-ordering format indicating means 118. In the preferred embodiment, the byte-ordering format indicating means 118 is implemented using a CPU-resident memory bit 119. When the current byte-order format bit 119 is a logical "1", it represents that the current byte-order format is bigendian format. When the current byte-order format bit 119 is a logical "0", it represents that the current byte-order format is little-endian format. It will be obvious to one skilled in the art that the logical representation of the current byte-order format bit 119 may be reversed. It will further be obvious to one skilled in the art that the CPU 110 may provide compatibility for a plurality of byte-order formats in addition to the standard big- and little- endian formats, and would require additional byte-order format bits to represent each format. The current byte-order format bit 119 of the present invention may be set to the specific byte-order format of the currently running application in any manner. A straightforward approach is to implement a special "set-byte-order-format" instruction which sets the current byte-order format bit 119 according to the byte-order format of any newly started application. In one embodiment, the instruction resides in the source code of the application itself and therefore is executed at application run time. In an alternative embodiment, the operating system detects the expected byte-order format of the application and sends the instruction at load time. In yet another alternative embodiment, the current byte-order mode bit 119 is set in hardware.

The computer system 100 of the present invention also includes a byte-order format conversion unit 140 for converting multi-byte data from the system default format (i.e., the byte-order format of the main memory 120) to another byte-order format. For example, if the main memory 120 is organized in big-endian format, the byte-order format conversion unit 140 of the present invention converts big-endian format multi-byte data to little-endian format multi-byte data.

The cache management unit 114 performs several important functions. First, the cache management unit 114 searches for and retrieves from the cache data items requested by the CPU 110. Second, the cache management unit 114 copies memory segments which contain requested data items not presently contained in the memory cache 130 from the main memory 120 into the memory cache 130. Third, the cache management unit 114 of the present invention determines, at cache move-in time, whether a byte-order format reorganization is necessary, and accordingly instructs the byte-order format conversion unit 140 to perform necessary multi-byte reorganizations. Finally, the cache management unit 114 generates main memory address mapping information and the byte-order format of data newly copied into the memory cache 130.

Figure 2:
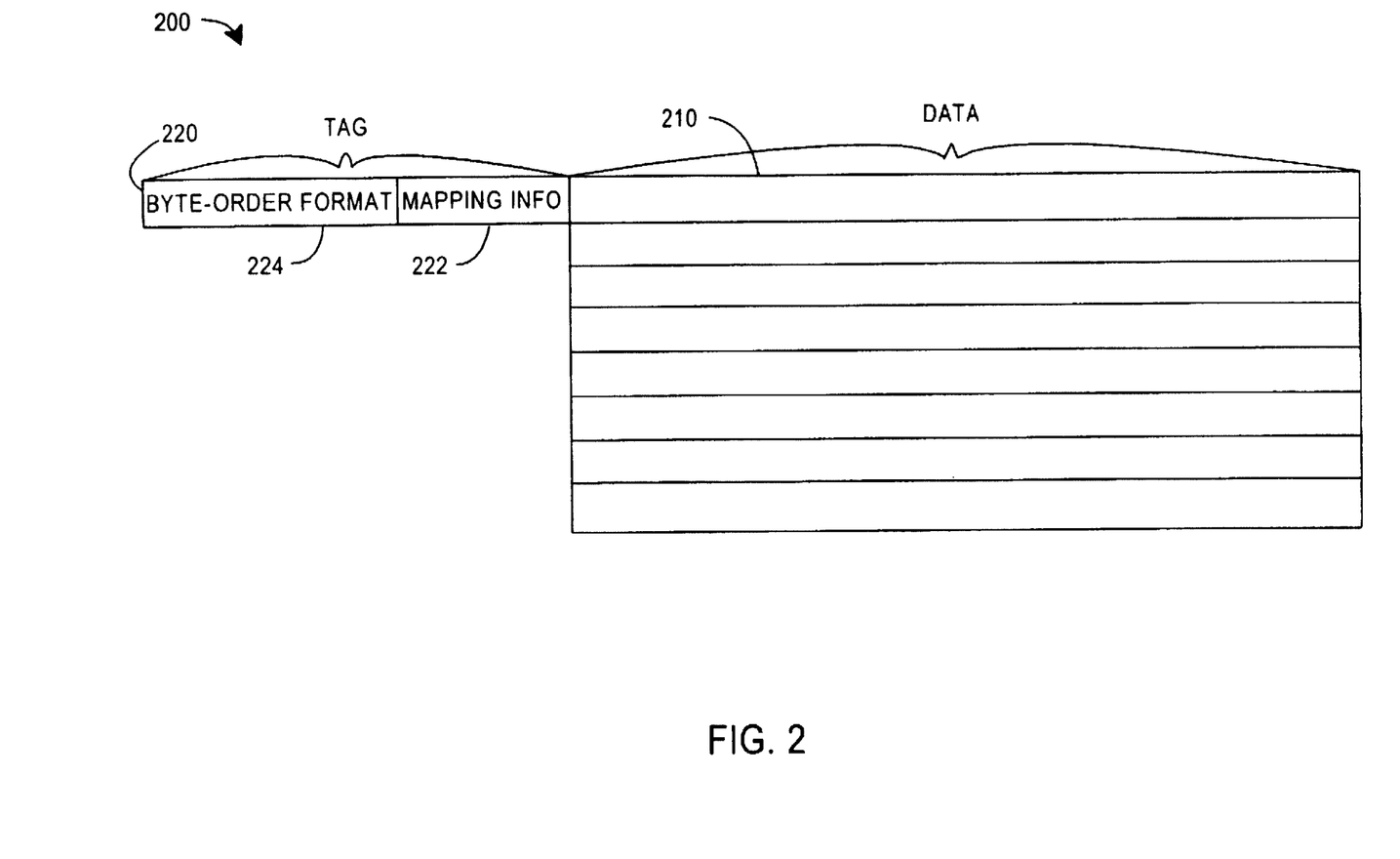
FIG. 2 shows the format of a cache line tag in accordance with the present invention.

FIG. 2 shows the format of a cache line 200 in accordance with the present invention. As shown in FIG. 2, a cache line 200 includes cache line data 210 and an associated cache line tag 220. For multi-byte data, the cache-line data 210 is stored in the current byte-order format as indicated by the current byte-order format indicating means 118 at the time of its entry into the cache 130. The cache line tag 220 may reside in the cache along with the cache line data 210, or alternatively, may reside apart from cache line data 210. The cache-line tag 220 includes a main memory address mapping information field 222 and a cache line byte-order format field 224. The main memory address mapping information field 222 allows the cache management unit 114 to quickly ascertain whether the cache memory 130 contains a requested data item. The cache management unit 114 cache search algorithm may be implemented using any workable means, including the use of either a direct- or an associative-mapping algorithm, both of which are known in the art. The cache line byte-order format field 224 allows the cache management unit 114 to determine whether the associated cache line data 220 is stored in the current byte-order format. In the preferred embodiment, the byte-order format indicator 224 is implemented with specially designated byte-order format bits. In a big- and little-endian compatible computing system, only a single extra bit is required to indicate the byte-order format of the cache line data 210. A bit value of "1" indicates big-endian format, while a bit value of "0" indicates small-endian format, or visa versa. As will be appreciated by one skilled in the art, additional bits may be used to indicate additional byte-order formats.

Figure 3:
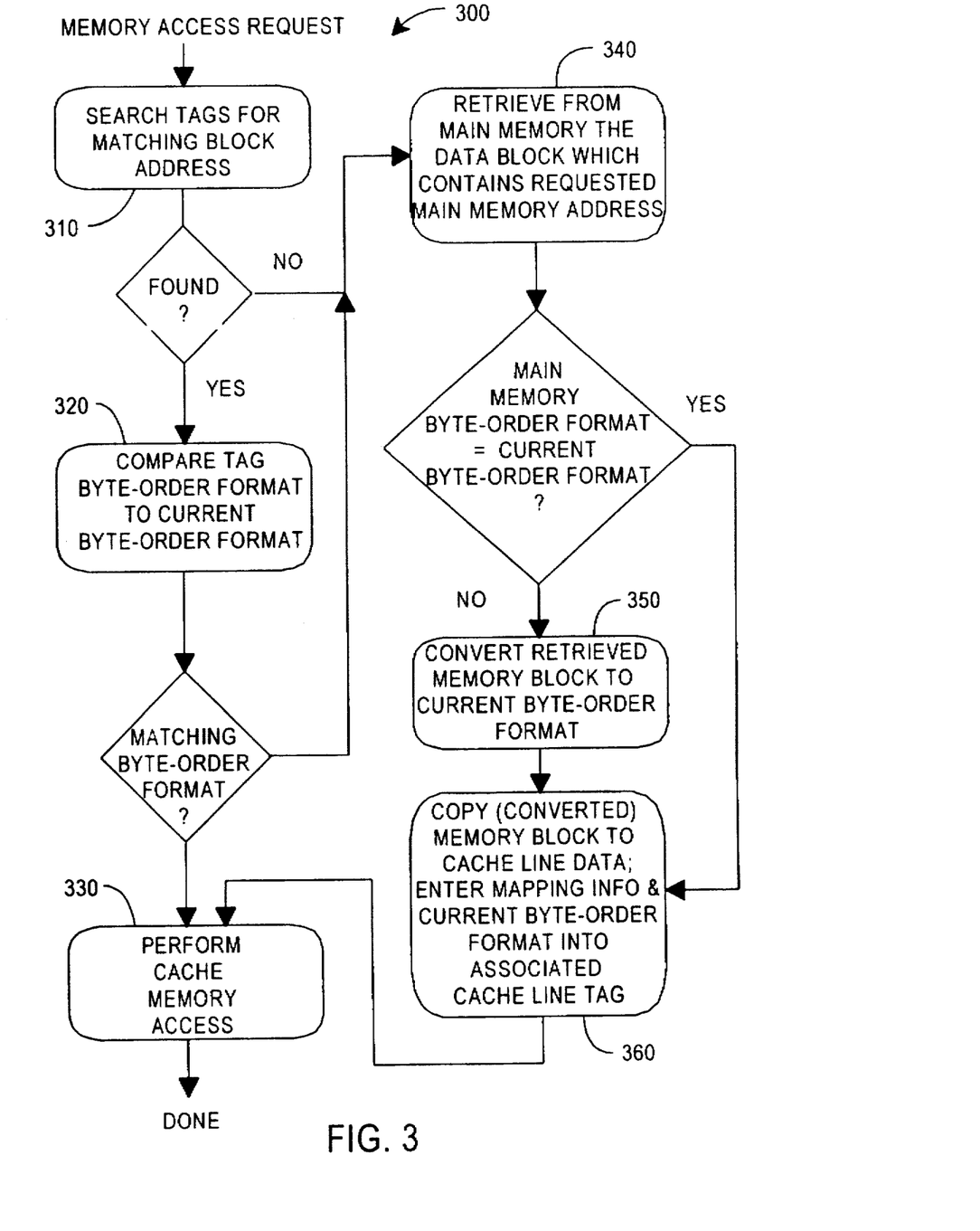
FIG. 3 is a flowchart of a method of operation for a cache management unit in accordance with the present invention.

FIG. 3 depicts a flowchart of a preferred embodiment method of operation of the cache management unit 114 of FIG. 1. The method, shown generally at 300, illustrates the operation of the cache management unit 114 upon receipt of a memory access request by the CPU 110. As shown in FIG. 3, the method 300 includes a first step of searching the cache tags for memory address mapping information that maps to the block of main memory in which the requested data item resides.

If a match is found, the method 300 includes a second step 320 of comparing the cache line byte-order format indicator to the current byte-order format as indicated by the current byte-order format indicating means 118. If the cache line byte-order format field matches the current byte-order format, then the requested memory access is performed on the data contained in the cache memory during a third step 330.

If, however, in first step 310 no cache tag contained main memory address mapping information that mapped to the requested main memory address, or if, in second step 320 the cache line byte-order format field did not match the current byte-order format, a fourth step 340 is performed. In the fourth step 340, the entire data segment in main memory that contains the requested data item is retrieved from main memory. If the main memory byte-order format does not match the current byte-order format, the retrieved memory segment is converted to the current byte-order format during a fifth step 350.

During a sixth step 360, the retrieved data, whether or not a byte-order conversion was performed in fifth step 350, is entered into a cache line using any suitable replacement algorithm. Replacement algorithms, such as the LRU (Least Recently Used) algorithm, are known in the art. In the LRU algorithm, the cache line which was least recently accessed by the cache management unit is overwritten with new cache line data. Also in sixth step 360, main memory address information and the current byte-order format are entered into a cache line tag associated with the cache line. As mentioned above, the cache line tag may reside in the cache memory itself, or in a separate tag memory. If the cache line tags reside in a separate tag memory apart from the cache lines, the tag memory is generally also fast memory to provide fast access time during cache searches.

As made apparent in the above description of the method 300 of FIG. 3 for use by the cache management unit 114 in cache management operations, it will be appreciated that the present invention provides maximum cache usage and memory access time efficiency. The method 300 of the present invention always examines the contents of the cache memory before performing a cache move-in from main memory. Thus, slow main memory accesses are always avoided if the cache contains a requested data item in the current byte-order format. In addition, the method 300 always performs any necessary byte-order format conversions during the main memory access and before data is entered in the cache. Thus, the data is stored in the cache in the current byte-order format at the time of the cache move-in. The likelihood that the current byte-order format will change during the execution of a given application is low, so the chances that the cache management unit 114 will have to fetch the same data and convert it to a different byte-order format is also low. However, because the data is stored in the current byte-order format at the time of cache move-in, the present invention avoids the necessity of performing byte-order conversions every time a memory access is requested by the CPU 110 during the execution of an application written for a non-default byte-order format. Instead, any necessary conversions are performed once at the time of entry into the cache when the system performance is naturally hindered by long main memory data access times. The present invention is thus able to minimize memory access time by increasing the likelihood that data is available in proper byte-order format in the cache memory.

Figure 4:
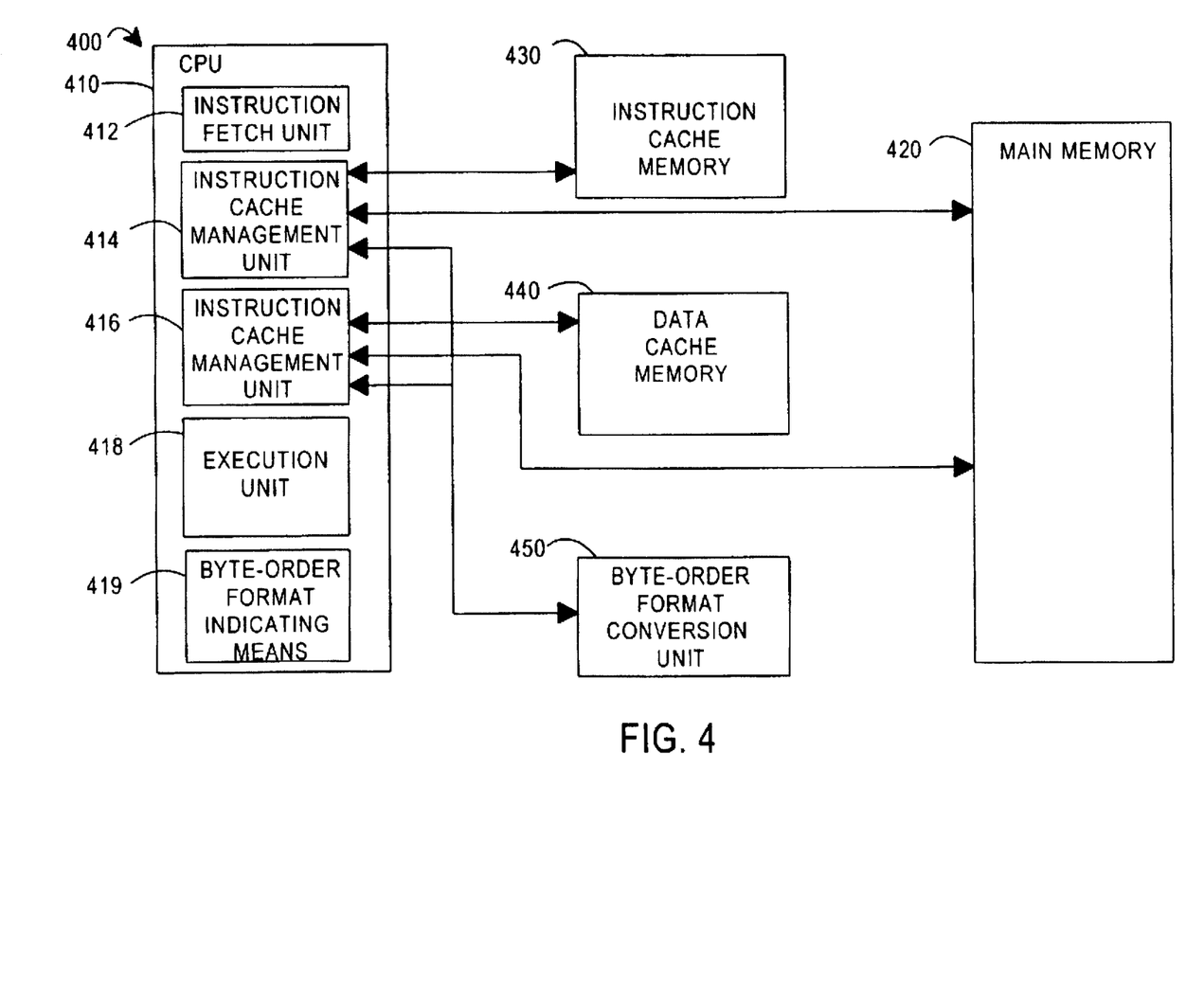
FIG. 4 is a block diagram of a second preferred embodiment microprocessor system in which the present invention operates.

FIG. 4 depicts another preferred embodiment of a system 400 in accordance with the present invention. As shown in FIG. 4, the preferred embodiment system 400 includes a central processing unit (CPU) 410, a main memory 420, an instruction cache 430, and a data cache 440. In the preferred embodiment system 400, the instruction cache 460 and data cache 470 are implemented separately using high-speed static RAM chips. The CPU 410 includes an instruction fetch unit 412, an instruction cache management unit 414, a data cache management unit 416, an execution unit 418, and a byte-order format indicating means 419.

In operation, the instruction fetch unit 412 fetches instructions from the instruction cache 430. The instruction cache management unit 414 performs the cache management functions of method 300 of FIG. 3 for the instruction cache 430, using the byte-order format indicating means 119 to determine the current byte-order format and the byte-order format conversion unit 450 to perform any necessary byte-order conversions. The execution unit 418 executes each fetched instruction received from the instruction fetch unit 412. If an instruction requires a data memory access, data memory is accessed from the data cache 440. The data cache management unit 416 performs the cache management functions of method 300 of FIG. 3 for the data cache 440, using the byte-order format indicating means 118 to determine the current byte-order format and the byte-order format conversion unit 450 to perform any necessary byte-order conversions.

The use of a separate instruction cache 430 and a separate data cache 440, as shown in FIG. 4, is useful in instruction pipelined systems in order to avoid cache access contention. Cache access contention, or cache "collisions", naturally result in a pipeline system because in an ideal pipeline, an instruction is fetched during the instruction fetch stage at the same time that the memory access stage is performing a memory access for another instruction. If the instructions and the data are stored in the same cache memory, cache memory access requests naturally collide, resulting in undesirable memory access delay. Separate instruction and data caches 430, 440, each with a dedicated cache management unit 414, 416, resolve the cache contention problem. To increase performance and flexibility, a separate byte-order format indicating means 118 and a separate byte-order format conversion unit 450 may be used.

Figure 5A:
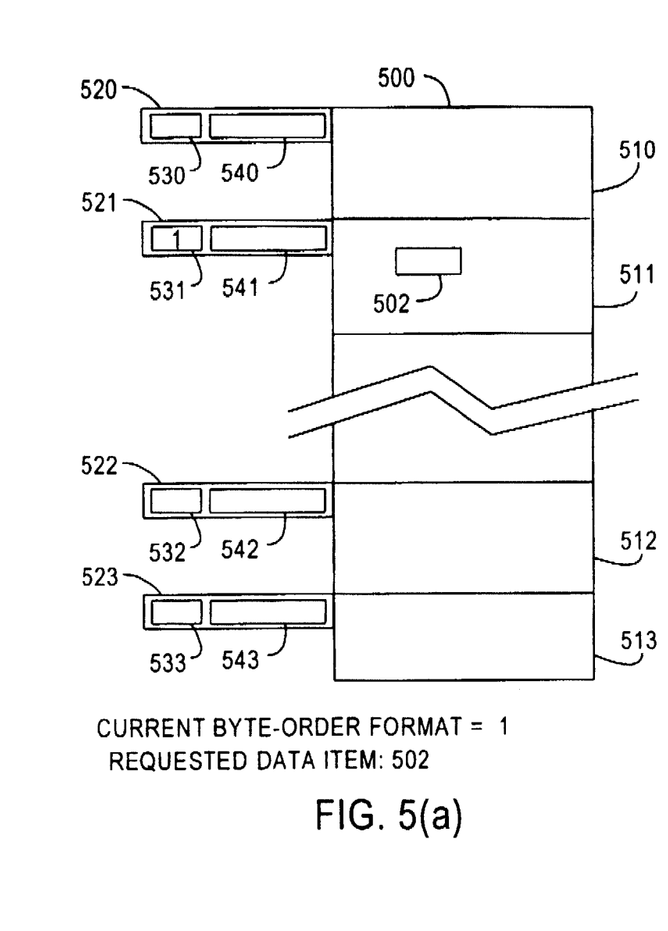
FIG. 5(a) is an internal view of a cache memory in accordance with the present invention before the receipt of a memory access request of a data item which is contained in the cache memory.
Figure 5B:
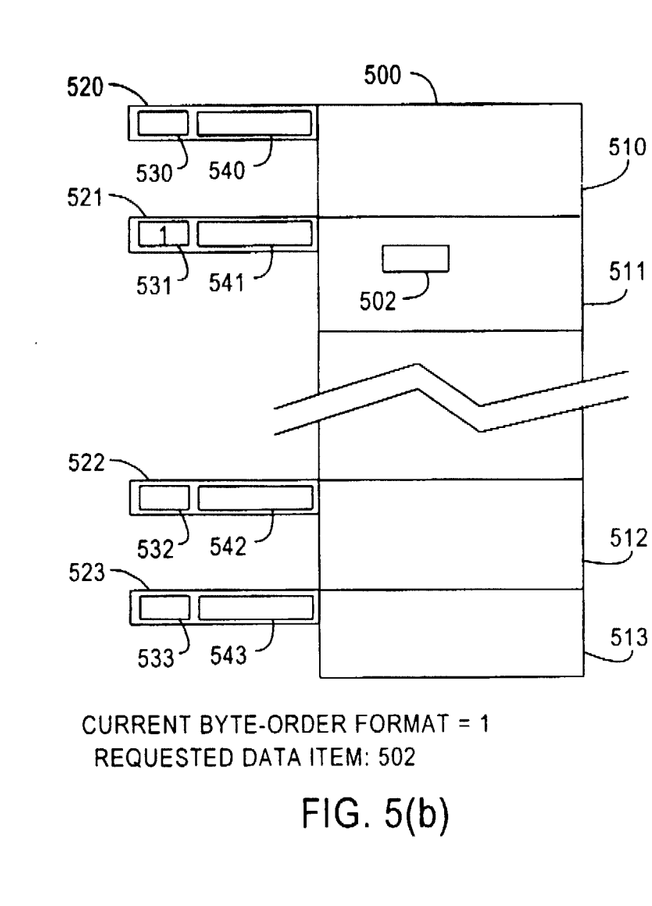
FIG. 5(b) shows the contents of the cache memory of FIG. 5(a) after the memory access request is performed.

FIGS. 5(a)–(b) illustrate the operations of a cache management unit and its effect on the contents of a cache memory in accordance with the present invention. FIG. 5(a) shows the contents of a cache memory 500 before the receipt of a memory access request of a data item 502 which is contained in the cache memory 500. As shown in FIG. 5 the cache memory 500 contains a plurality of cache lines 510–513 and their associated tags 520–523. Each tag 520–523 includes a byte-order format indicator 530–533 which indicates the byte-order format of the data in its associated cache line 510–513. Each tag 520–523 also includes memory mapping information 540–543 to indicate the main memory address of the data in its associated cache line 510–513. FIG. 5(a) also shows that the current byte-order format is big-endian format, represented by a bit with logic value "1". The current byte-order format is implemented with a single bit value of either "0" or "1", and as shown in FIG. 5(a), the current byte-order format is set to "1" As also shown in FIG. 5(a), a requested data item 502 is resident in the cache memory 500 in cache line 511, and is stored in the current byte-order format "1" as indicated by the byte-order format indicator 531 in the tag 521 associated with cache line 511.

The cache management unit performs a sequence of operations upon receipt of the memory access request for data item 502. The cache management unit first performs a search of the tags 520–523. Upon matching the memory mapping information 541 of tag 521 with the requested main memory address, the cache management unit compares the contents of the byte-order format indicator 531 to the current byte-order format ("1"). Since the contents of the byte-order format indicator 531 matches the current byte-order format, the cache management unit performs the requested memory access from cache line 511.

FIG. 5(b) shows the contents of a cache memory 500 after the memory access request is performed, and, as shown, the contents are unchanged.

Figure 6A:
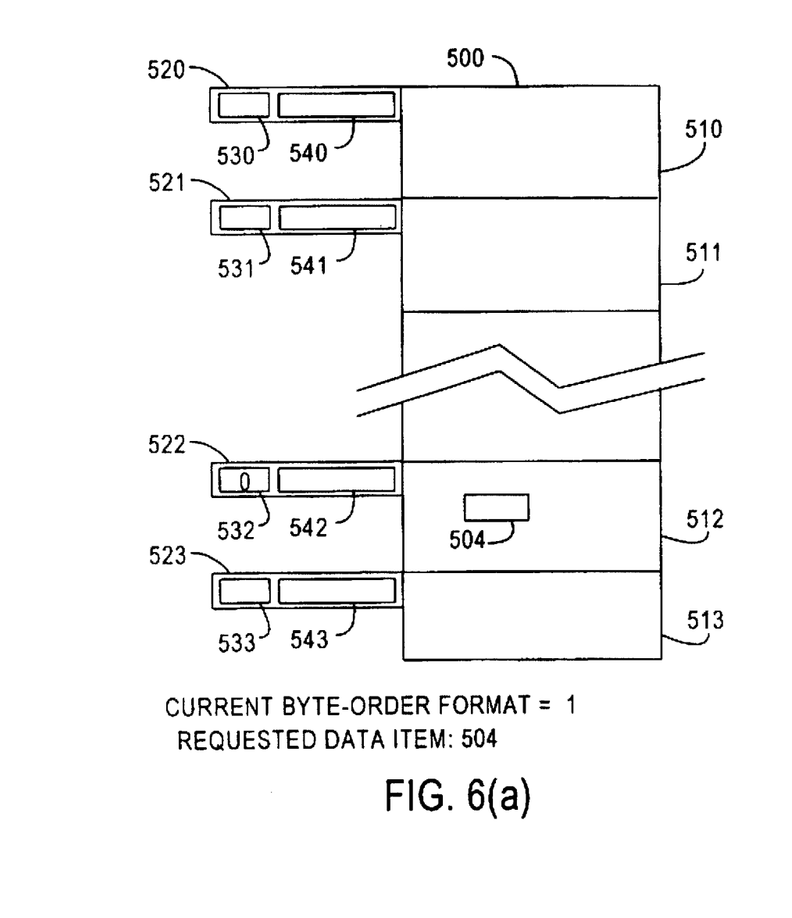
FIG. 6(a) is an internal view of a cache memory in accordance with the present invention before the receipt of a memory access request of a data item which is contained in the cache memory but which is not stored in the current byte-order format, and where the current byte-order format does not match the default byte-order format of the main memory.
Figure 6B:
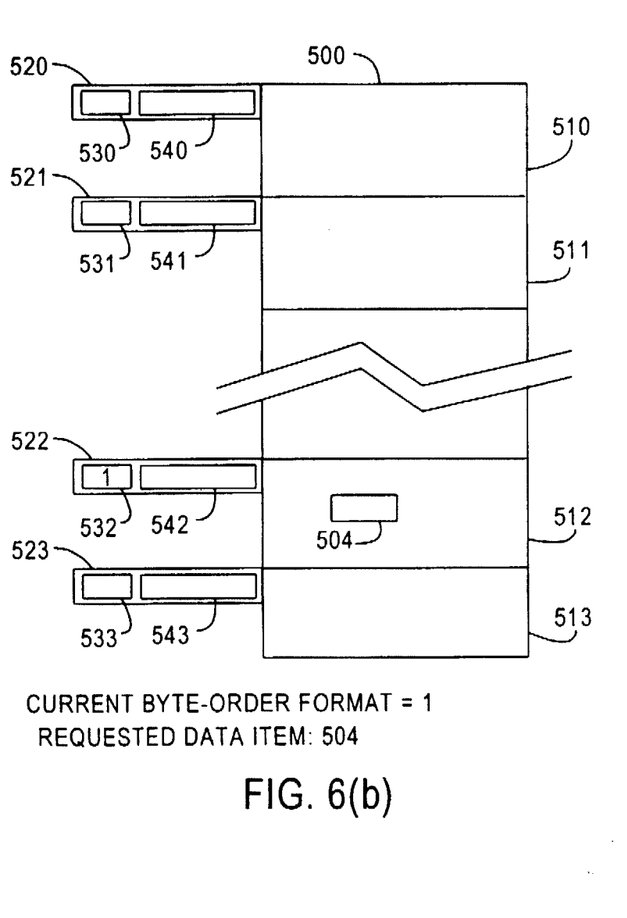
FIG. 6(b) shows the contents of the cache memory of FIG. 6(a) after the memory access request is performed.

FIGS. 6(a) and (b) illustrate the operation of the cache management unit and its effect on the contents of the cache memory 500 of FIG. 5 in response to a memory access request of data item 504, where data item 504 is contained in the cache memory 500 but which is not stored in the current byte-order format, and where the current byte-order format does not match the default byte-order format of the main memory. As shown in FIG. 6(a), data item 504 is resident in the cache in cache line 512 but is not stored in the current byte-order format ("1"), as indicated by the contents ("0") of the byte-order format indicator 532 of the associated cache line tag 522. Further, the current byte-order format ("1") does not match the default byte-order format ("0") of main memory.

The cache management unit performs a sequence of operations upon receipt of the memory access request for data item 504. The cache management unit first performs a search of the tags 520-523. Upon matching the memory mapping information 542 of tag 522 with the requested main memory address, the cache management unit compares the contents of the byte-order format indicator 532 to the current byte-order format ("1"). Since the contents ("0") of the byte-order format indicator 532 do not match the current byte-order format ("1"), the cache management unit retrieves the block of main memory containing the requested data item 504. Next, the cache management unit compares the current byte-order format ("1") to the default main memory byte-order format ("0"). Since the current byte-order format ("1") does not match the default main memory byte-order format ("0"), the cache management unit causes the byte-order format conversion unit to convert the retrieved block of main memory to the current byte-order format ("1"). The converted retrieved memory block is then stored in cache line 512 in the cache memory 500. The byte-order format indicator 532 is updated to the current byte-order format ("1") and the memory mapping information 542 of tag 522 is updated at this time. It will be noted that the original cache line 512 which contained the requested data item 504 in the wrong byte-order format need not necessarily be overwritten, and thus the converted retrieved memory block containing the requested data item 504 in the correct byte-order format may be copied into any available cache line. For convenience of illustration, however, the cache line is simply overwritten. Finally, the cache management unit performs the requested memory access of data item 504 from cache line 512.

FIG. 6(b) shows the contents of the cache memory 500 after the memory access request is performed. As shown, the cache memory 500 now contains a cache line 512 which contains a copy of the main memory block corresponding to the requested data item 504. As indicated by the contents ("1") of the of the byte-order format field 532 of the associated cache line tag 522, the byte-order format of data item 504 contained in cache line 512 now matches the current byte-order format.

Figure 7A:
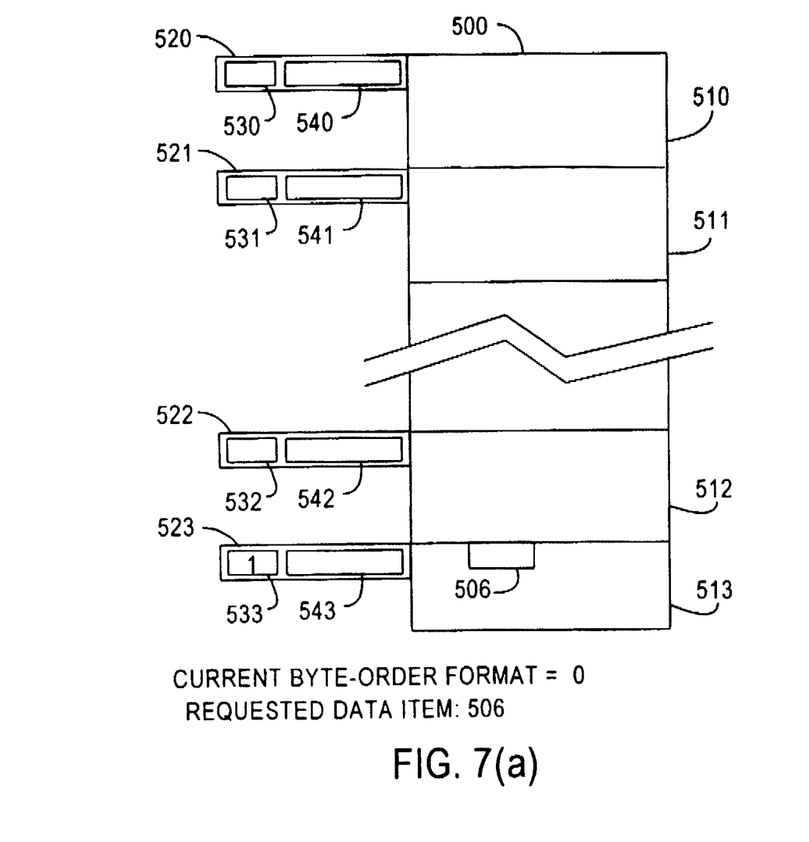
FIG. 7(a) is an internal view of a cache memory in accordance with the present invention before the receipt of a memory access request of a data item which is contained in the cache memory but which is not stored in the current byte-order format, and where the current byte-order format matches the default byte-order format of the main memory.
Figure 7B:
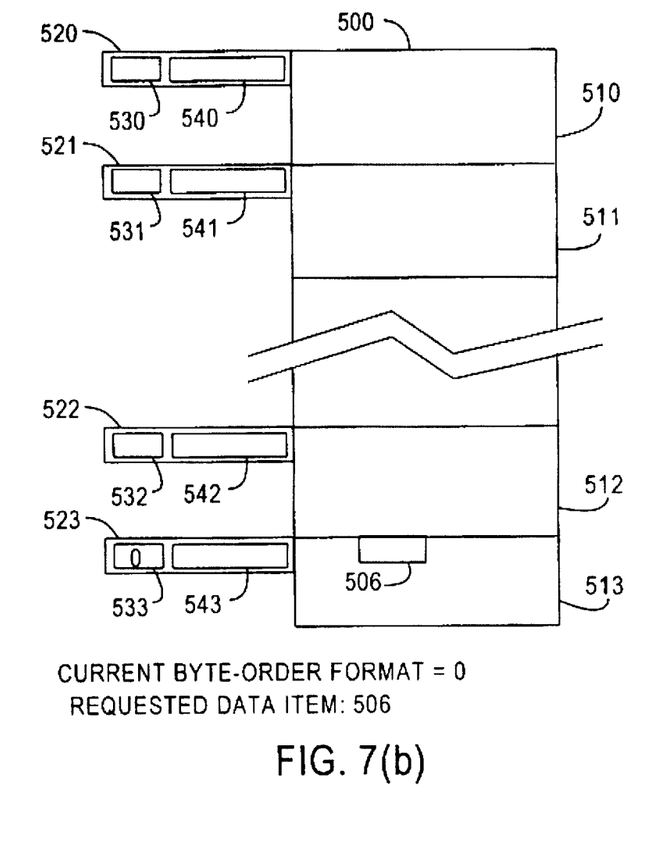
FIG. 7(b) shows the contents of the cache memory of FIG. 7(a) after the memory access request is performed.

FIGS. 7(a) and (b) illustrate the operation of the cache management unit and its effect on the contents of the cache memory 500 of FIG. 5 in response to a memory access request of data item 506, where data item 506 is contained in the cache memory 500 but which is not stored in the current byte-order format, and where the current byte-order format matches the default byte-order format of the main memory. As shown in FIG. 7(a), data item 506 is resident in the cache in cache line 513 but is not stored in the current byte-order format ("0"), as indicated by the contents ("1") of the byte-order format indicator 533 of the associated cache line tag 523. The current byte-order format ("0"), however, does match the default byte-order format ("0") of main memory.

The cache management unit performs a sequence of operations upon receipt of the memory access request for data item 506. The cache management unit first performs a search of the tags 520-523. Upon matching the memory mapping information 542 of tag 522 with the requested main memory address, the cache management unit compares the contents of the byte-order format indicator 532 to the current byte-order format ("0"). Since the contents ("1") of the byte-order format indicator 532 do not match the current byte-order format ("0"), the cache management unit retrieves the block of main memory containing the requested data item 506. Next, the cache management unit compares the current byte-order format ("0") to the default main memory byte-order format ("0"). Since the current byte-order format ("0") matches the default main memory byte-order format ("0"), the cache management unit bypasses the byte-order format conversion unit. The retrieved memory block is then stored in cache line 513 in the cache memory 500. The byte-order format indicator 533 is updated to the current byte-order format ("0") and the memory mapping information 543 of tag 523 is updated at this time. It will be noted that the original cache line 513 which contained the requested data item 506 in the wrong byte-order format need not necessarily be overwritten, and thus the converted retrieved memory block containing the requested data item 506 in the correct byte-order format may be copied into any available cache line. For convenience of illustration, however, the cache line is simply overwritten. Finally, the cache management unit performs the requested memory access of data item 506 from cache line 513.

FIG. 7(b) shows the contents of the cache memory 500 after the memory access request is performed. As shown, the cache memory 500 now contains a cache line 513 which contains a copy of the main memory block corresponding to the requested data item 506. As indicated by the contents ("0") of the of the byte-order format field 533 of the associated cache line tag 523, the byte-order format of data item 506 contained in cache line 513 now matches the current byte-order format.

Figure 8A:
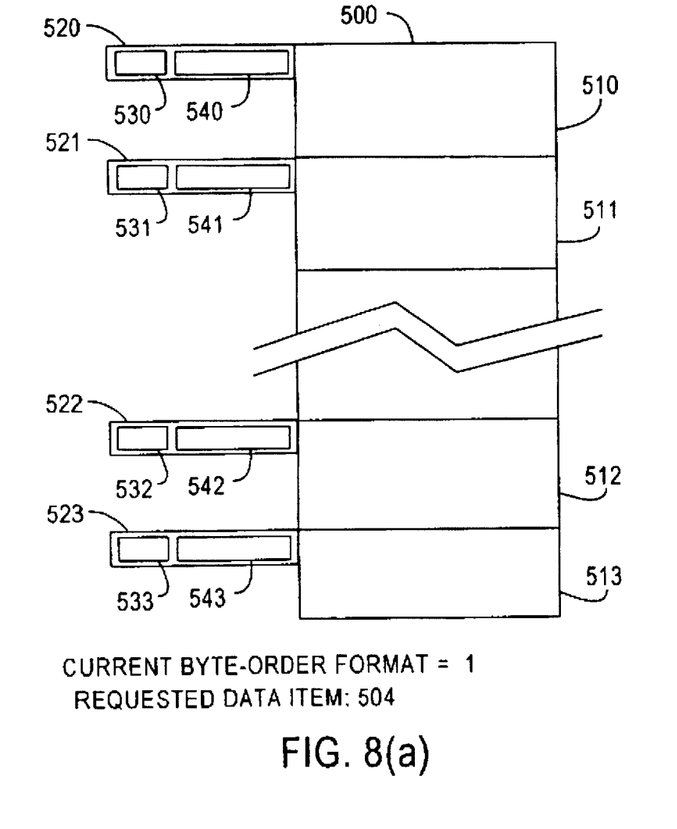
FIG. 8(a) is an internal view of a cache memory in accordance with the present invention before the receipt of a memory access request of a data item which is not contained in the cache memory, and where the current byte-order format does not match the default byte-order format of the main memory.
Figure 8B:
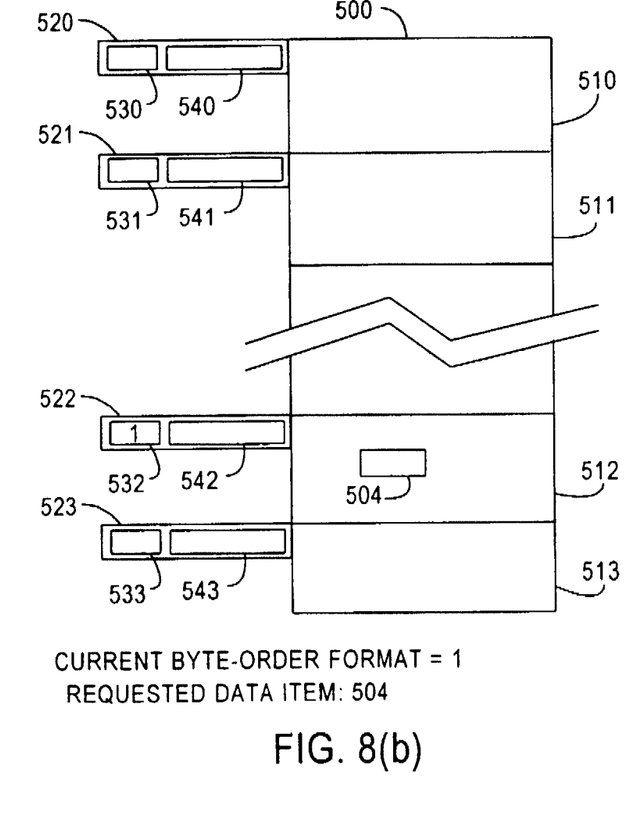
FIG. 8(b) shows the contents of the cache memory of FIG. 8(a) after the memory access request is performed.

FIGS. 8(a) and (b) illustrate the operation of the cache management unit and its effect on the contents of the cache memory 500 of FIG. 5 in response to a memory access request of data item 504, where data item 504 is not contained in the cache memory 500, and where the current byte-order format does not match the default byte-order format of the main memory. As shown in FIG. 8(a), data item 504 is not resident anywhere in the cache 500. As also seen in FIG. 8(a), the current byte-order format ("1") does not match the default byte-order format ("0") of main memory.

The cache management unit performs a sequence of operations upon receipt of the memory access request for data item 504. The cache management unit first performs a search of the tags 520-523. Since none of the tags 520-523 contain memory mapping information 540-543 which match the requested main memory address, the cache 500 does not contain the requested data item 504. The cache management unit then retrieves the block of main memory containing the requested data item 504. Next, the cache management unit compares the current byte-order format ("1") to the default main memory byte-order format ("0"). Since the current byte-order format ("1") does not match the default main memory byte-order format ("0"), the cache management unit causes the byte-order format conversion unit to convert the retrieved block of main memory to the current byte-order format ("1"). The converted retrieved memory block is then stored in cache line 512 in the cache memory 500. The byte-order format indicator 532 is updated to the current byte-order format ("1") and the memory mapping information 542 of tag 522 is updated at this time. Finally, the cache management unit performs the requested memory access of data item 504 from cache line 512.

FIG. 8(b) shows the contents of the cache memory 500 after the memory access request is performed. As shown, the cache memory 500 now contains a cache line 512 which contains a copy of the main memory block corresponding to the requested data item 504. As indicated by the contents ("1") of the of the byte-order format field 532 of the associated cache line tag 522, the byte-order format of data item 504 contained in cache line 512 matches the current byte-order format.

Figure 9A:
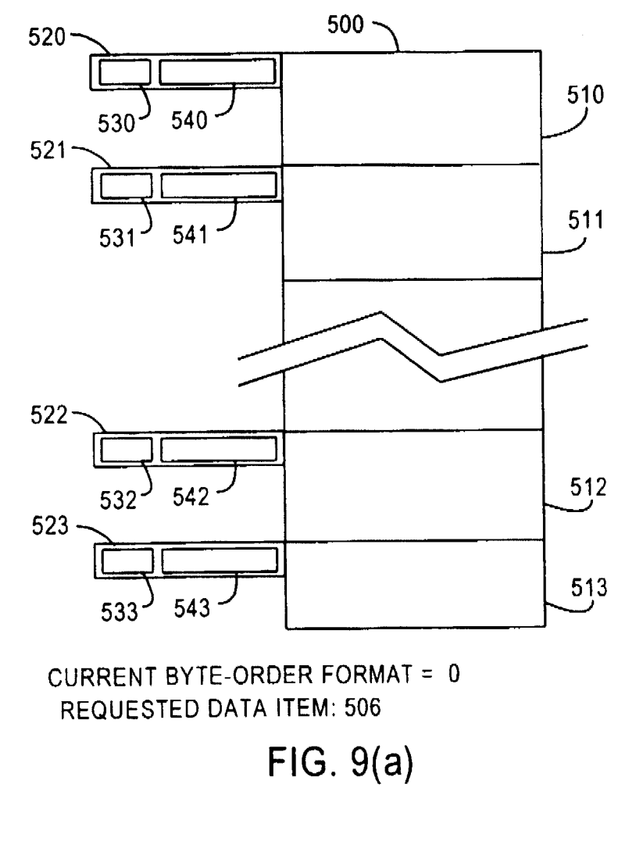
FIG. 9(a) is an internal view of a cache memory in accordance with the present invention before the receipt of a memory access request of a data item which is not contained in the cache memory, and where the current byte-order format matches the default byte-order format of the main memory.
Figure 9B:
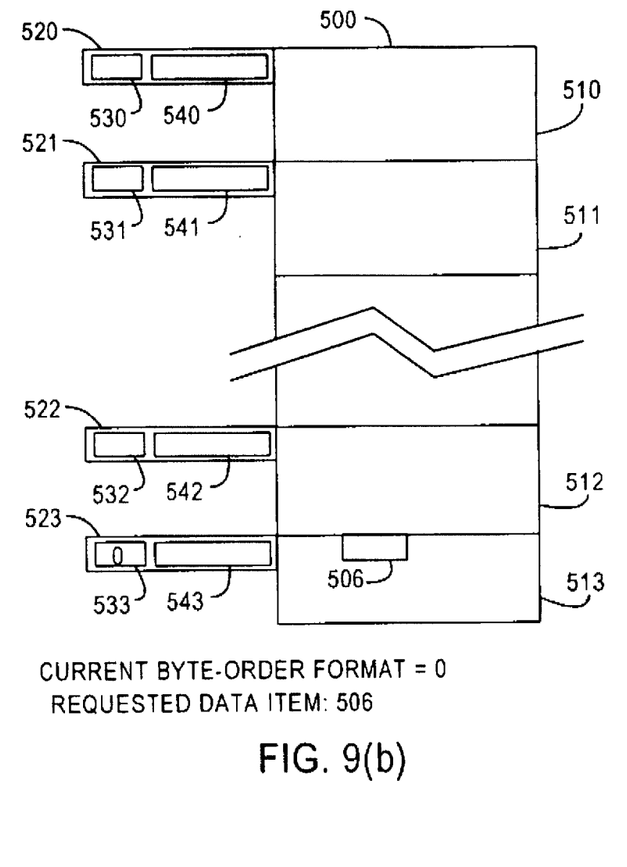
FIG. 9(b) shows the contents of the cache memory of FIG. 9(a) after the memory access request is performed.

FIGS. 9(a) and (b) illustrate the operation of the cache management unit and its effect on the contents of the cache memory 500 of FIG. 5 in response to a memory access request of data item 506, where data item 506 is not contained in the cache memory 500, and where the current byte-order format matches the default byte-order format of the main memory. As shown in FIG. 9(a), data item 506 is not resident anywhere in the cache 500. As also seen in FIG. 9(a), the current byte-order format ("0") matches the default byte-order format ("0") of main memory.

The cache management unit performs a sequence of operations upon receipt of the memory access request for data item 506. The cache management unit first performs a search of the tags 520–523. Since none of the tags 520–523 contain memory mapping information 540–543 which match the requested main memory address, the cache 500 does not contain the requested data item 506. The cache management unit then retrieves the block of main memory containing the requested data item 506. Next, the cache management unit compares the current byte-order format ("0") to the default main memory byte-order format ("0"). Since the current byte-order format ("0") matches the default main memory byte-order format ("0"), the cache management unit bypasses the byte-order format conversion unit. The retrieved memory block is then stored in cache line 513 in the cache memory 500. The byte-order format indicator 533 is updated to the current byte-order format ("0") and the memory mapping information 543 of tag 523 is updated at this time. Finally, the cache management unit performs the requested memory access of data item 506 from cache line 513.

FIG. 9(b) shows the contents of the cache memory 500 after the memory access request is performed. As shown, the cache memory 500 now contains a cache line 513 which contains a copy of the main memory block corresponding to the requested data item 506. As indicated by the contents ("0") of the of the byte-order format field 533 of the associated cache line tag 523, the byte-order format of data item 506 contained in cache line 513 matches the current byte-order format.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A system for indicating byte-order format information of multi-byte data contained in a cache memory, said cache memory for storing and providing fast access to data from a main memory, the system comprising:
   a plurality of cache lines contained in the cache memory, each cache line comprising cache line data copied from one or more main memory addresses of the main memory; and
   a plurality of cache line tags, each of which is associated with a respective cache line, and each comprising a main memory address mapping field for providing main memory address mapping information for the cache line data of its associated cache line and a cache line byte-order format field for indicating a byte-order format of the cache line data of its associated cache line.

2. The system of claim 1, wherein the plurality of corresponding cache line tags reside in the cache memory.

3. The system of claim 1, wherein each cache line byte-order format field contains a bit representation to indicate at least a big-endian byte-order format and a little-endian byte-order format.

4. A system for managing cache move-in operations in a computer system which is compatible with multiple byte-order formats, said computer system having a main memory organized in a default byte-order format and a cache memory for storing and providing fast access to data copied from the main memory, said system comprising:
   a central processing unit;
   a current byte-order format indicating means for indicating the current byte-order format of a currently running application;
   a format conversion unit for converting multi-byte data from the default byte-order format to the current byte-order format;
   a plurality of cache lines residing in the cache memory, each respective cache line comprising cache line data copied from one or more main memory address of the main memory; and
   a plurality of cache line tags, each of which is associated with a respective cache line, and each comprising a main memory address mapping field for providing main memory address mapping information for the cache line data of its associated cache line, and a cache line byte-order format field for indicating a byte-order format of the cache line data of its associated cache lines;
   wherein cache line data copied from one or more main memory addresses of the main memory is converted to the current byte-order format by the format conversion unit, prior to being moved into the cache memory, if the default byte-order format of the main memory differs from the current byte-order format of a currently running application.

5. The system of claim 4, wherein the plurality of corresponding cache line tags reside in the cache memory.

6. The system of claim 4, wherein each cache line byte-order format field contains a bit representation to indicate at least a big-endian byte-order format and a little-endian byte-order format.

7. The system of claim 4, wherein the central processing unit comprises cache management means responsive to an access request of a requested main memory address, said cache management means for:
   searching for a matching cache line which,
      contains the requested main memory address; and
      is stored in the current byte-order format;
   performing the memory access request on the cache line data of the matching cache line when the requested main memory address resides in the cache memory;
   retrieving a block of main memory in which a requested main memory address resides when the requested main memory address does not reside in the cache memory;
   causing the format conversion unit to convert the retrieved block of main memory to the current byte-order format when the default byte-order format does not match the current byte-order format;

storing the retrieved block of main memory in current byte-order format in a selected cache line, and then performing the memory access request on the selected cache line data.

8. The system of claim 4, wherein the format conversion unit is responsive to a format conversion signal generated by the central processing unit.

9. A method for managing cache move-in operations in a computer system which is compatible with multiple byte-order formats, said computer system having a central processing unit, a main memory organized in a default byte-order format, a cache memory comprising a plurality of cache lines for storing cache line data, a plurality of corresponding cache line tags, each associated with a respective cache line and each comprising a main memory address mapping field and a cache line byte-order format field, a current byte-order format indicating means for indicating a current byte-order format of a currently running application, and a format conversion unit for converting multi-byte data from the default byte-order format to the current byte-order format, said method comprising the steps of:

(a) receiving an access request for a requested main memory address;

(b) searching the cache line tags for a matching cache line tag which has both a main memory address mapping field that maps to a block of main memory in which the requested main memory address resides and a cache line byte-order format field whose contents match the current byte-order format;

(c) if a matching cache line tag is not found:

(i) retrieving the block of main memory in which the requested main memory address resides;

(ii) converting the retrieved block to the current byte-order format if the current byte-order format does not match the default byte-order format; and (iii) entering the converted block into a chosen cache line, and entering main memory address information and the current byte-order format into a cache line tag associated with the chosen cache line; and (d) performing the access request on the respective cache line data associated with the matching cache line tag.

* * * * *